US011316369B2

(12) United States Patent
van Duijsen et al.

(10) Patent No.: US 11,316,369 B2
(45) Date of Patent: Apr. 26, 2022

(54) CONTACTLESS CHARGER SYSTEM FOR CHARGING AN ELECTRIC VEHICLE

(71) Applicant: Technische Universiteit Delft, Delft (NL)

(72) Inventors: Peter Johan van Duijsen, Delft (NL); Pavol Bauer, Delft (NL); Tim Velzeboer, Delft (NL)

(73) Assignee: Fesla Charge B.V., Delft (NL)

( * ) Notice: Subject to any disclaimer, the term of this patent is extended or adjusted under 35 U.S.C. 154(b) by 212 days.

(21) Appl. No.: 16/618,190

(22) PCT Filed: Jun. 1, 2018

(86) PCT No.: PCT/EP2018/064436
§ 371 (c)(1),
(2) Date: Nov. 29, 2019

(87) PCT Pub. No.: WO2018/220164
PCT Pub. Date: Dec. 6, 2018

(65) Prior Publication Data
US 2020/0114771 A1  Apr. 16, 2020

(30) Foreign Application Priority Data

Jun. 2, 2017 (NL) ..................... 2019015

(51) Int. Cl.
*H02J 50/00* (2016.01)
*H02J 50/10* (2016.01)
(Continued)

(52) U.S. Cl.
CPC .............. *H02J 50/10* (2016.02); *B60L 50/60* (2019.02); *B60L 53/12* (2019.02); *B60L 53/122* (2019.02);
(Continued)

(58) Field of Classification Search
CPC .... H02J 50/10; H02J 50/12; H02J 7/02; H02J 50/005; B60L 50/60; B60L 53/12;
(Continued)

(56) References Cited

U.S. PATENT DOCUMENTS 5,617,003 A * 4/1997 Odachi ................. B60L 53/60
                                                    320/108
5,719,546 A    2/1998 Ito et al.
(Continued)

FOREIGN PATENT DOCUMENTS

DE       201 11 386 U1    9/2001
DE       102013001240 A1  7/2014
(Continued)

OTHER PUBLICATIONS

Beh et al., "Magnetic Couplers in Kickstands for Wireless Charging of Electric Bicycles", 978-1-4799-2325-0/14/S31.00 © 2014 IEEE.

*Primary Examiner* — Nghia M Doan
(74) *Attorney, Agent, or Firm* — N.V. Nederlandsch Octrooibureau

(57) ABSTRACT

A contactless charger system for charging a power storage unit of an electrically driven vehicle, such as an e-bike. The contactless charger system has a power transmission part with a primary coil around a primary magnetic circuit part including two primary pole faces, and a power receiving part with a secondary coil around a secondary magnetic circuit part having two secondary pole faces (8). In operation, the two primary pole faces and the two secondary pole faces are aligned such that the primary and secondary magnetic circuit parts form a closed magnetic circuit. The secondary magnetic circuit part is an integral part of an electrically driven vehicle stand.

10 Claims, 3 Drawing Sheets

(51) Int. Cl.
  *H02J 50/12*   (2016.01)
  *B60L 53/122*  (2019.01)
  *H01F 38/14*   (2006.01)
  *H02J 7/02*    (2016.01)
  *B60L 50/60*   (2019.01)
  *B60L 53/12*   (2019.01)
  *B60L 53/34*   (2019.01)

(52) U.S. Cl.
  CPC .............. *B60L 53/34* (2019.02); *H01F 38/14* (2013.01); *H02J 7/02* (2013.01); *H02J 50/12* (2016.02); *B60L 2200/12* (2013.01)

(58) Field of Classification Search
  CPC .... B60L 53/34; B60L 53/122; B60L 2200/12; B60L 50/20; B60L 53/39; H01F 38/14; Y02T 90/12; Y02T 90/14; Y02T 10/7072; Y02T 10/70
  See application file for complete search history.

(56) References Cited

U.S. PATENT DOCUMENTS

| | | | |
|---|---|---|---|
| 2013/0005251 | A1   | 1/2013  | Soar |
| 2017/0288444 | A1 * | 10/2017 | Komulainen ........... H02J 50/40 |
| 2020/0290467 | A1 * | 9/2020  | Gao ....................... H02J 50/90 |

FOREIGN PATENT DOCUMENTS

| | | | | |
|---|---|---|---|---|
| EP | 0902523    | A1 * | 3/1999  | ............ B60L 53/122 |
| EP | 0902523    | A1   | 3/1999  | |
| WO | 03/096361  | A1   | 11/2003 | |
| WO | 2014/179869| A1   | 11/2014 | |

\* cited by examiner

CONTACTLESS CHARGER SYSTEM FOR CHARGING AN ELECTRIC VEHICLE

FIELD OF THE INVENTION

The present invention relates to a contactless charger system for charging a power storage unit of an electrically driven vehicle, e.g. implemented as a rechargeable battery.

BACKGROUND ART

The article 'Magnetic Couplers in Kickstands for Wireless Charging of Electric Bicycles' by Hui Zhi (Zak) Beh et al., as presented at the Twenty-Ninth Annual IEEE Applied Power Electronics Conference and Exposition (APEC), 16-20 Mar. 2014, discloses an overview of possible charging systems for contactless charging of batteries of an e-bike vehicle. All solutions relate to the use of inductive coupling of a primary and secondary coil with a single pole piece.

German Utility patent publication DE-U-201 11 386 discloses a charging unit used for a contactless transfer of electric power to a mobile unit, a complementary power absorbing device and a charging system. The charging unit transfers electric power from at least one primary winding to at least one secondary winding arranged in a mobile unit by means of an alternating magnetic field. The charging unit comprises a substantially U-shaped ferrite core having a base area and two leg areas, each provided with a pole face, onto which the primary winding is arranged. A power absorbing device and a charging system, which permit an improved magnetic coupling between the primary side and the secondary side and consequently an improved power transfer between them, is also provided.

International patent publication WO2014/179869 discloses a system for transmission of power using inductive wireless coupling. The system includes an environmentally sealed dongle and a mounting component, which releasably mates with the dongle. The dongle is sized for use with one hand, and may be coupled by an umbilical to either a garment of a user or to a vehicle structure (e.g. a seat), in which case the mounting component is coupled to the vehicle structure or to the garment respectively. The dongle and the mounting component include first and second inductive coils respectively and corresponding ferrite cores. The coils are positioned within the dongle and mounting component so that they are aligned for their inductive coupling when the dongle and mounting component are mated. The positioning and alignment of the coils provides a substantially closed magnetic path between the coils.

US patent publication U.S. Pat. No. 5,719,546 discloses an inductive coupler forming a closed magnetic circuit by mating a primary core assembly having a primary winding, and a secondary core assembly having a secondary winding. It is used for transferring electrical power from the primary winding to the secondary winding by electromagnetic induction, for recharging a battery for electrically powered vehicles. A thin magnetic protective sheet is attached to the mating surfaces of at least one of the primary and secondary core assemblies to protect the mating surfaces. Provision of slits in the magnetic protective sheet reduces eddy currents flowing in the magnetic sheet.

International patent publication WO03/096361 discloses a magnetic core component for receiving electrical power by induction. The core component includes a thin sheet of amorphous magnetic material in a non-annealed state. The non-annealed material is flexible and non-brittle thus resistant to physical shocks, thus can be used in portable electronic devices such as mobile telephones and the like which may be subject to physical shocks.

SUMMARY OF THE INVENTION

The present invention seeks to provide an improved version of known electrical vehicle charger systems.

According to the present invention, a contactless charger system as defined above is provided, wherein the contactless charger system comprises a power transmission part having a primary coil around a primary magnetic circuit part comprising two primary pole faces and a power receiving part having a secondary coil around a secondary magnetic circuit part comprising two secondary pole faces. The two primary pole faces and the two secondary pole faces are aligned such that in operation, the primary and secondary magnetic circuit parts form a closed magnetic circuit. The secondary magnetic circuit part is an integral part of an electrically driven vehicle stand. This allows to efficiently and conveniently charge a power storage unit of an electrically driven vehicle, such as a rechargeable battery of an electric driven bicycle.

The present invention embodiments use a double pole construction to fully enclose the magnetic path in order to optimize the coupling between the power transmission part and the power receiving part, by minimizing the magnetic path through air. The magnetic field lines only travel through air from the primary pole face to the secondary pole face. In a specific embodiment, a surface area of the secondary pole faces is equal to or smaller than a surface area of the primary pole faces, which allows a large relative displacement between the primary and secondary pole faces (both laterally and rotationally). This allows a very wide range of displacement of e.g. a kickstand of an e-bike in which the power receiving part is integrated without any loss of efficiency because the coupling between the primary pole face and secondary pole face remains nearly the same.

SHORT DESCRIPTION OF DRAWINGS

The present invention will be discussed in more detail below, with reference to the attached drawings, in which FIG. 1 shows a perspective view of a part of a power transmission part of a contactless charger system according to an embodiment of the present invention.

DESCRIPTION OF EMBODIMENTS

Figure 1:
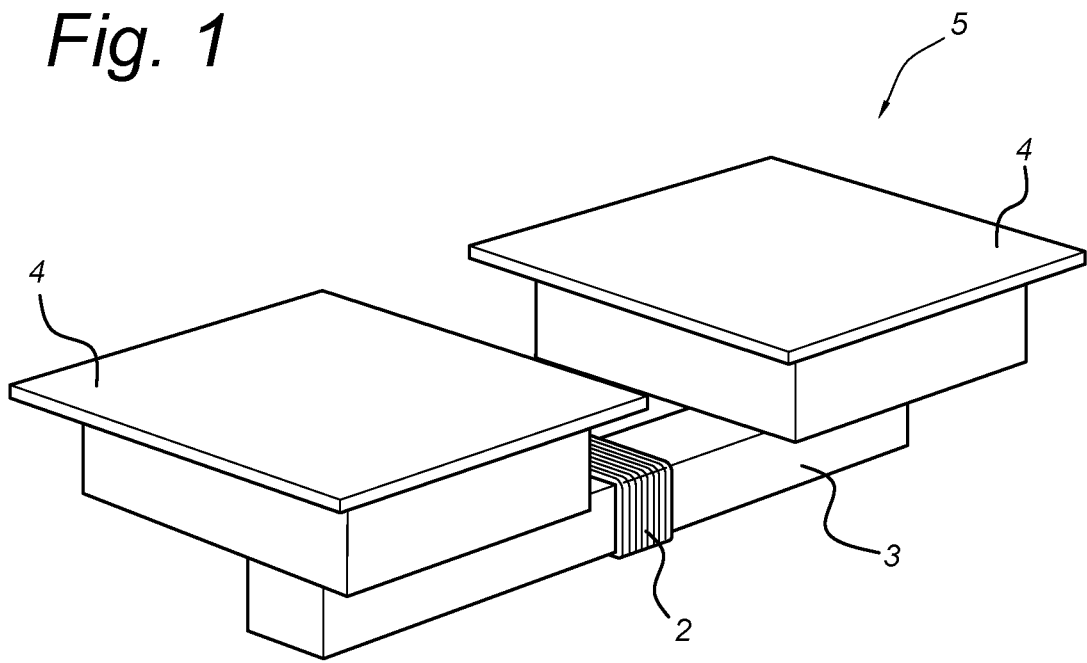

Magnetic fields are widely being used for the transfer of power or information. Inductive Power Transfer (IPT) systems are designed to deliver power efficiently from a primary source to a secondary load via a magnetic coupling. There is a high demand for having a wireless solution as a method of charging a power storage unit for electric vehicles (EVs). The most commonly proposed and used technology for wireless EV battery charging is based on the inductive power transfer between two coupled coils, one connected to an electrical power supply (e.g. a utility grid) and the other one connected to the power storage unit, e.g. in the form of a rechargeable battery. Inductive power transfer is advantageous owing to its safety and comfort due to the lack of a plug-in operation, which in general allows the battery charging operation to start automatically. The two major types of inductive power transfer for wireless charging of EV's are static inductive power transfer, in which the vehicle is kept stationary (e.g. in a parking area) or a dynamic inductive power transfer where the vehicle is in motion during charging. The wireless power transfer obviously represents the only solution for the dynamic charging, since the wired connection would be impossible to operate during the motion of an EV. Commercial applications of the wireless IPT system are being used in public areas (e.g. railway station, bus station, shopping centre, city centres, leisure attractions and parks), outside office centres, consumer applications, charging at home and outside in front of the house.

Despite the aforementioned advantages, inductive power transfer still has several issues which makes it less apt for to the current EV market. First of all, the IPT system is inherently less efficient in terms of power transfer efficiency when compared to a conventional wire-based system. Due the magnetic coupling between the coils, there is an unavoidable minimum leakage magnetic field, leading to energy losses. Furthermore, some technical aspects need to be taken into account for the practical implementation of an IPT system. One example is that to obtain an efficient coupling, the misalignment between the primary coil and the secondary coil must be as small as possible. Even though the IPT system allows to reduce a number of risks, such as electrocution risk, care is required regarding magnetic field exposure. Thus in addition to design-related issues, other important considerations such as costs, infrastructural implications, standardization and customer acceptation need to be taken care off in order to make the IPT system suitable as a marketable product.

In one embodiment of the present invention, the contactless charger system is being used in an electrically driven vehicle, which is e.g. an electric bike (e-bike). Electric bikes are light and compact electrical vehicles, representing a category of transportation means in the current and future scenarios of a smart and green urban mobility, and come in various versions, such as electrically assisted bikes and electrically driven bikes. Due to the generally frequent use of e-bikes, and therefore a necessity to recharge them, the wireless solution is considered as the most appropriate way of e-bike charging, which is based on inductive power transfer. In this scenario, no external parts nor any external wires for coupling are required. This makes an e-bike using inductive power transfer more robust compared to existing e-bike chargers having a cable connection. Market potential for this technology is high since retrofit of the present invention embodiments to existing e-bikes is possible.

FIG. 1 shows a perspective view of a part of a power transmission part 5 of a contactless charger system 1 according to an embodiment of the present invention. The power transmission part 5 comprises a primary coil 2 around a primary magnetic circuit part 3 having two primary pole faces 4. The primary magnetic circuit part 3 can be made in any suitable shape, e.g. as shown the primary magnetic circuit part 3 is made having tube like parts with a rectangular (even square) shape around which the primary coil 2 is wound. The primary pole faces 4 are also made in a rectangular shape and positioned at the ends of the primary magnetic circuit part 3. Alternatively (or partially) the primary magnetic circuit part 3 may have other cross sectional shapes, e.g. circular, elliptical, or polygonal. The primary pole faces 4 have a larger surface area compared to the cross section of the primary magnetic circuit part 3. The power transmission part 5 can be installed on the ground or in the ground. If the power transmission part 5 is installed in e.g. a parking area, then the electric vehicle only has to park above the power transmission part 5 in order to recharge its rechargeable battery.

Figure 2:
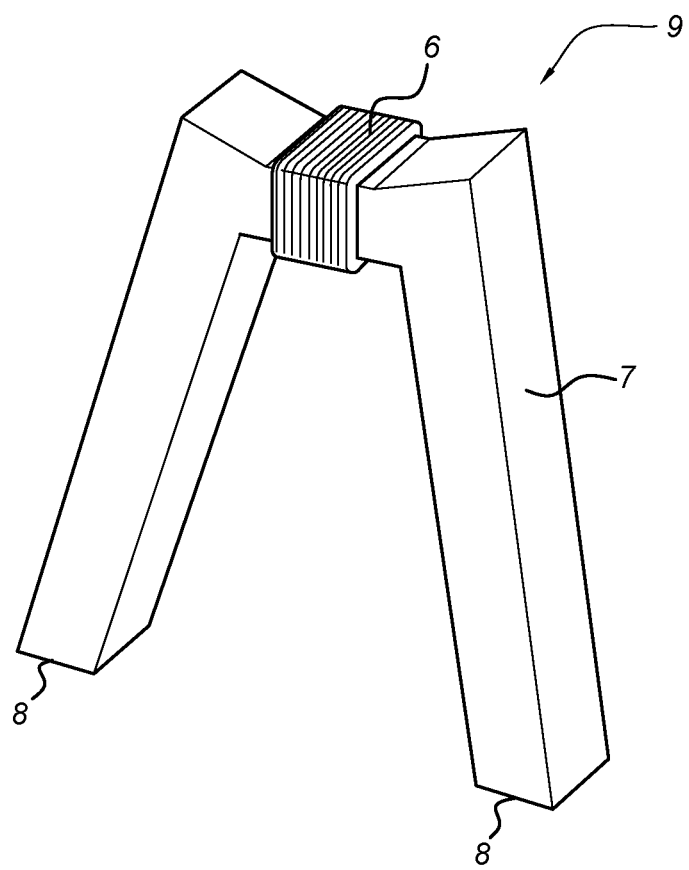
FIG. 2 shows a perspective view of a power receiving part of a contactless charger system according to an embodiment of the present invention.

FIG. 2 shows a perspective view of a power receiving part 9 of a contactless charger system according to an embodiment of the present invention. The power receiving part 9 comprises a secondary coil 6 around a secondary magnetic circuit part 7 having two secondary pole faces 8. In a generic embodiment of the present invention contactless charger system, during operation, the two primary pole faces 4 and the two secondary pole faces 8 are aligned such that, the primary and secondary magnetic circuit parts 3, 7 form a closed magnetic circuit. In order to form a closed magnetic circuit, the primary and secondary magnetic circuit parts 3, 7 are e.g. made of a magnetic conducting material, and are e.g. formed as yokes. As an exemplary embodiment, the magnetic conducting material is a ferrite material having a low magnetic hysteresis and a low eddy current loss within an operating frequency range between 50 and 150 kHz.

The advantages of this double pole inductive power transfer implementation will be discussed in more detail below with reference to FIG. 4. In known inductive power coupling implementations of battery chargers for electrical vehicles, the set-up is a single pole implementation, which requires a close as possible positioning of the primary and secondary coils. In such known implementations, the magnetic circuit is closed via air, which inherently makes coupling less efficient. The present invention embodiments allow to close the magnetic circuit with a sufficiently small magnetic resistance, as the air gaps between the primary and secondary pole faces 4, 8 can be very small.

Figure 3:
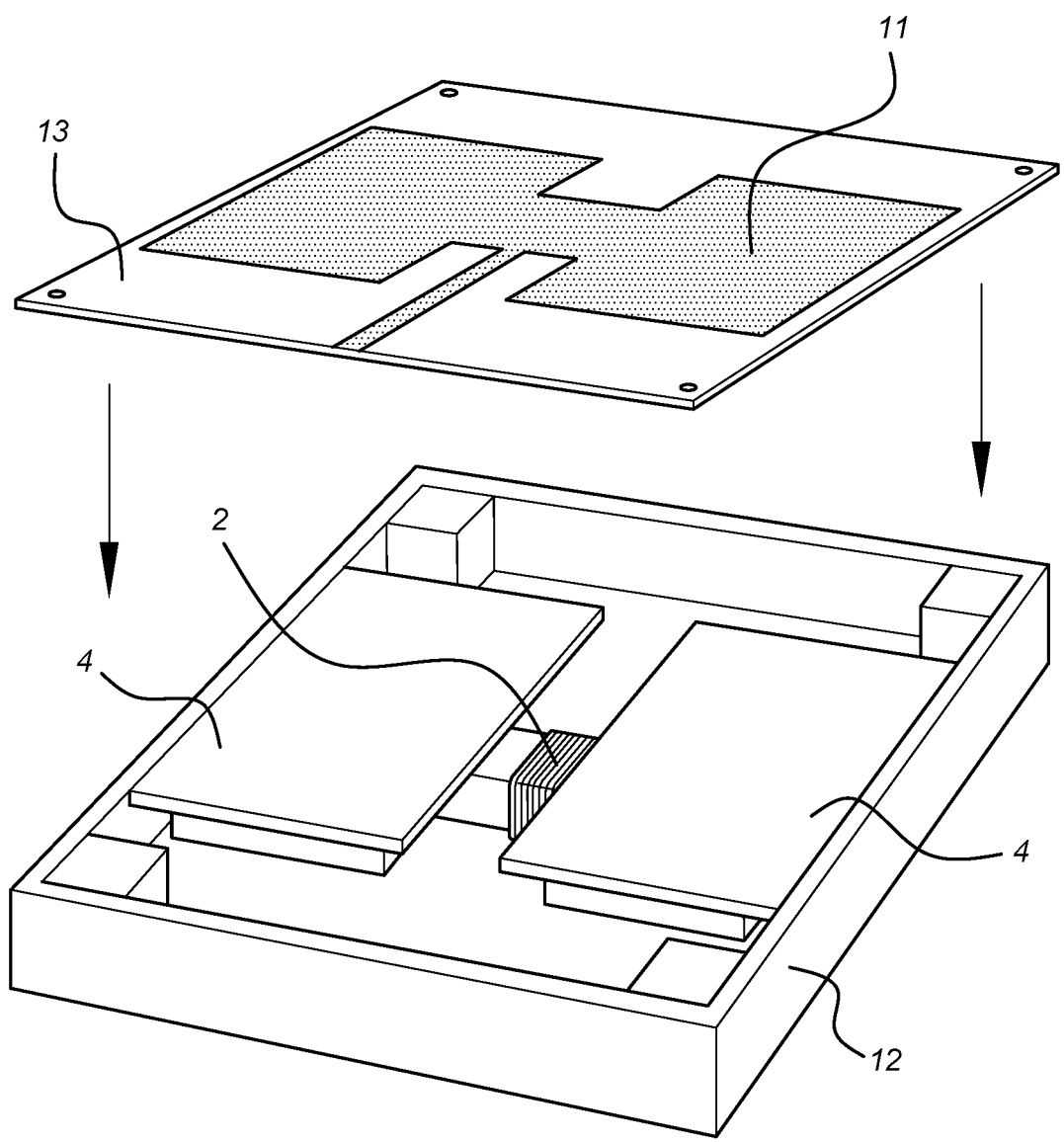
FIG. 3 shows a perspective view of a power transmission part of a contactless charger system according to a further embodiment of the present invention.

FIG. 3 shows a perspective view of a power transmission part of a contactless charger system according to a further embodiment of the present invention. In the embodiment shown, the power transmission part 5 of the contactless charger system comprises a contact surface 11 and the two primary pole faces 4 are flat surfaces aligned with the contact surface 11. The contact surface can be a flat surface as shown in FIG. 3, allowing to easily align the two primary pole faces 4 with the contact surface 11. This will also allow the secondary pole surfaces 4 of the power receiving part 9 to rest onto the contact surface 11 of the power transmission part 5.

To further enhance the power transfer efficiency, in further embodiments use is made of resonance circuitry in the power transmission part 5 and/or in the power receiving part 9, e.g. by adding a capacitor is series or parallel to the primary and secondary coil 2, 6, respectively. The resonant circuitry can be designed to be operative in the range from 50-150 kHz (or even higher), e.g. at 85 kHz.

As shown in the exemplary embodiment of FIG. 3, the power transmission part 5 comprises a housing 12. This allows to place the power transmission part 5 of the contactless charger system in the ground (i.e. below a ground surface level), thus not providing any obstacle. The power transmission part 5 of the contactless charger may comprise a shielding cover 13 in an even further embodiment, e.g. as a cover part of the housing 12, as shown. The shielding cover 13 protects the contents of the housing 12 (i.e. the power transmission part 5 components such as the primary pole faces 4) against external effects such as rain, oxidation, rust formation etc., and at the same time can also be of a material shielding off any possible electric or magnetic radiation. It is noted that the contact surface 11 may be a part of the shielding cover 13, but as the contact surface 11 may be seen as part of the magnetic circuit, the material of the contact surface part 11 is of a non-shielding material (as indicated in the FIG. 3 embodiment). The shielding cover 13 and associated surface part 11 allow to have a proper (magnetic) contact between the primary pole faces 4 and secondary pole faces 8 during the inductive charging. In an alternative or additional embodiment of the present invention, at least the primary coil 2 and primary magnetic circuit part 3 (and possible also other components of the power transmission part 5) are embedded in a plastic material to make the contactless charging system waterproof. In an even further alternative or additional embodiment, in one embodiment of the present invention the power transmission part 5 is stationary, e.g. located in an assigned parking space.

In one specific embodiment of the present invention, the secondary magnetic circuit part 7 of the contactless charger system is an integral part of a bicycle stand 10 or a kickstand of the e-bike. The bicycle stand 10 has the purpose of keeping a bicycle upright while it is not being used. There are two different types bicycle kickstands namely single support and double support stands. The single support kickstand usually comprises a side stand that utilizes a single leg that flips out to one side and the bicycle leans against it to stay standing. The double support stand involves having two supports like a two-legged stand at the centre of the bicycle or a bracket stand installed at the rear wheel of the bicycle that flips straight down which lifts the rear wheel off the ground. The embodiment of the present invention power receiving part 9 as described above and shown in FIG. 2, can easily be implemented in the bicycle stand 10 when formed as a double support stand having a two-legged stand at the centre of the bicycle. The secondary coil 6 can be installed on or around the bicycle stand 10 allowing easy and cost-efficient integration with existing components of an e-bike.

To use an inductive power transfer implementation using the present invention embodiments, it is possible to position the bicycle stand 10 of the e-bike (more particularly the secondary pole faces 8 of the power receiving part 9) over the contact surface 11 (more particularly the primary pole faces 4) of the power transmission part 5. Alignment and separation between the primary pole faces 4 and the secondary pole faces 8 can be sufficiently controlled in order to keep the magnetic resistance of the magnetic circuit low.

The present invention embodiments as shown in the figures and described herein use a double magnetic pole instead of having only a single pole. When a single pole is used, a long magnetic air path is needed for closing the field lines of the magnetic circuit of a contactless charger system using closely positioned primary and secondary coils. However by using the double pole, the magnetic field lines are guided by the material of the magnetic circuit itself, thus allowing to obtain a closed magnetic circuit with only two very small air gaps (between the primary and secondary pole surfaces 4, 8). This improves the efficiency of the contactless charger system considerably.

Figure 4:
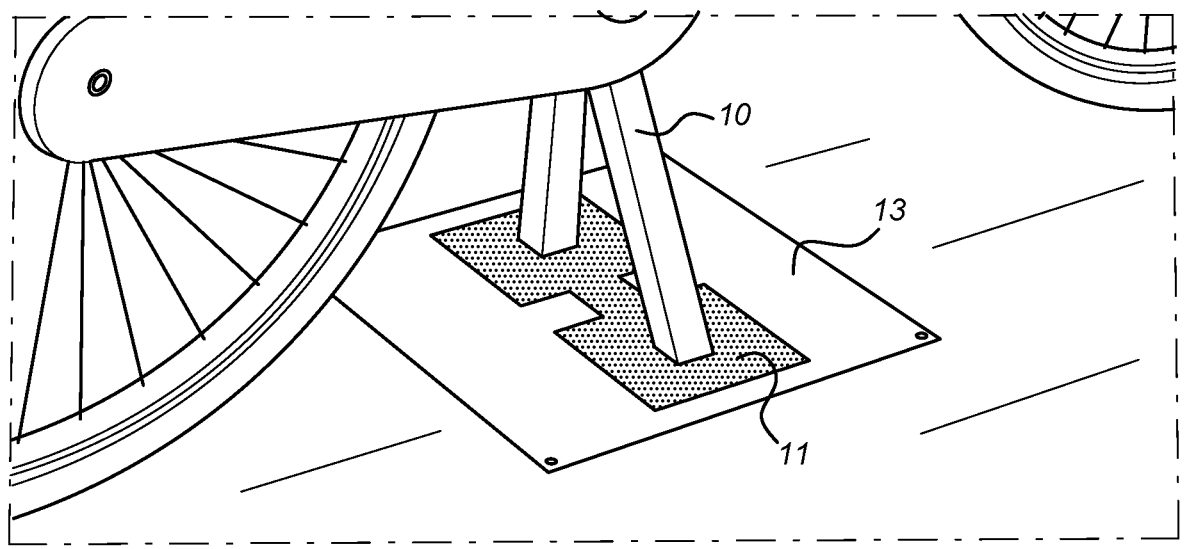
FIG. 4 shows a perspective view of a contactless charger system according to an even further embodiment of the present invention in operation.

FIG. 4 shows a perspective view of a contactless charger system according to an even further embodiment of the present invention which shows that during operation, the two primary pole faces 4 and the two secondary pole faces 8 are aligned such that the primary and secondary magnetic circuit parts 3, 7 form a closed magnetic circuit. This gives the user a lot of freedom to place his e-bike with the present invention power receiving part 9 implemented therein on top of the power transmission part 5 embedded in the ground surface.

In an even further embodiment, the implementation of which is shown in the embodiments of FIG. 1-4, a surface area of the secondary pole faces 8 is equal to or smaller than a surface area of the primary pole faces 4. This allows an even easier placement of the e-bike above the power transmission part 5 without the requirement of a precise alignment, both in lateral position as in mutual direction, as long as the primary and secondary poles are roughly aligned to allow transfer of power In an exemplary embodiment, the lateral displacement may be even more than 10 cm, and the primary and secondary pole alignment may be as high as 60 degrees. In all these embodiments a reduction of stray losses is achieved by guiding the magnetic field through a well-defined magnetic circuit.

Figure 5:
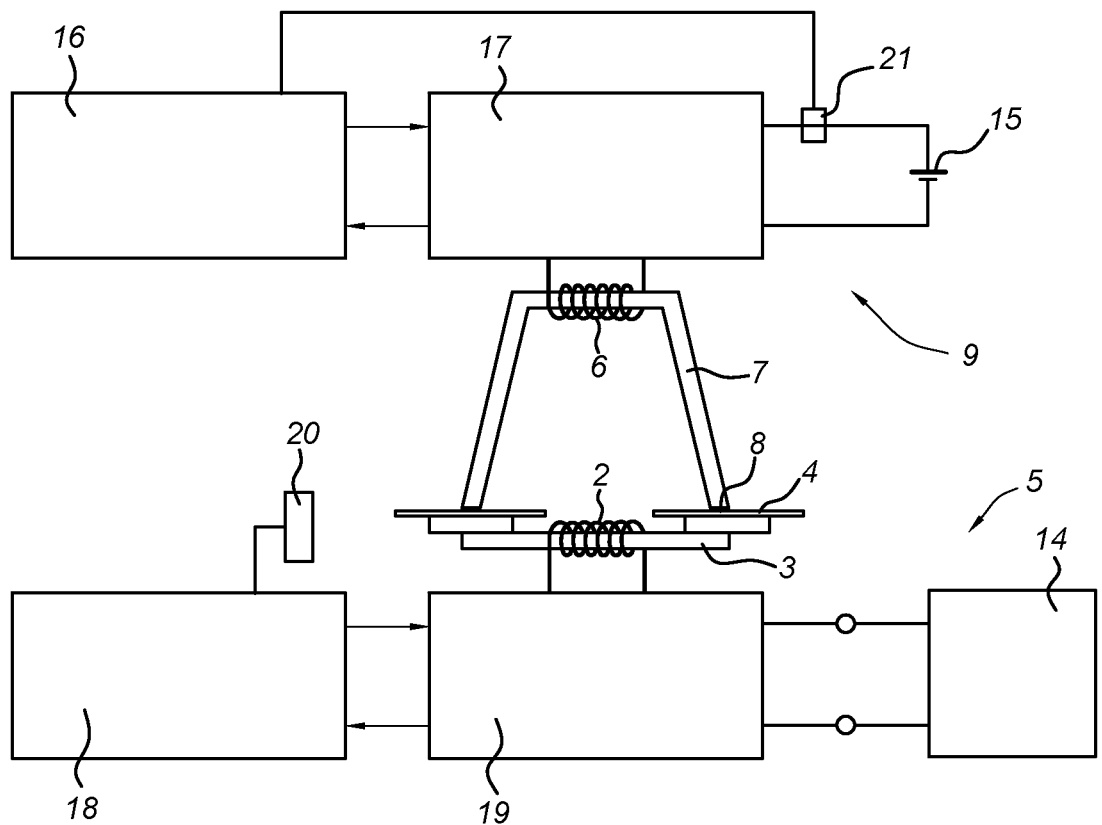
FIG. 5 shows a schematic diagram of the contactless charger system according to an embodiment of the present invention.

FIG. 5 shows a schematic diagram of the contactless charger system according to an embodiment of the present invention. In the embodiment shown, the power receiving part 9 further comprises a secondary control unit 16 which is operatively connected to a secondary power transmission electronics unit 17. The secondary power electronics unit 17 is in operation connected to the secondary coil 6, and to a power storage unit 15 (e.g. a battery of the e-bike). The secondary control unit 16 may be connected to one or more secondary sensors 21 for operational control of the power receiving part 9. A secondary sensor 21 is e.g. implemented as a current sensor 21 measuring the current to the power storage unit 15, as indicated in the embodiment of FIG. 5.

In the embodiment shown in FIG. 5, the power transmission part 5 further comprises a primary control unit 18 which is operatively connected to a primary power transmission electronics unit 19. The primary power electronics unit 19 is in operation connected to the primary coil 2, and to an (external) mains supply 14 for providing electrical power to the contactless charger system. The primary control unit 18 may be connected to one or more primary sensors 20 for operational control of the power transmission part 5. In the embodiment shown in FIG. 5, the primary sensor 20 is implemented as a proximity sensor 20 arranged close to one of the magnetic poles 4, e.g. in order to detect the presence or absence of the secondary magnetic circuit part 7 (i.e. a kick stand of an e-bike).

In a further exemplary embodiment, the primary control unit 18 and secondary control unit 16 may be arranged with data interfacing capabilities, e.g. using Bluetooth, Wi-Fi or other wireless data transmission units. The primary control unit 18 may then be arranged to be active to provide power to the primary coil 2 only after receiving a control command from the secondary control unit 16. The primary control unit 18 may further be arranged (with an appropriate primary sensor 20) to detect foreign objects (i.e. not a secondary magnetic circuit part 7) being placed on or near the primary pole faces 4. If a foreign object is detected, the primary control unit 18 can then shut down the primary power electronics unit 19 to prevent any possible dangerous situations.

The exemplary embodiment shown in the schematic diagram of FIG. 5 can be described in an even more general sense as a further embodiment of the present invention, wherein the contactless charger system further comprises at least one primary sensor 20 connected to a primary power unit 18, 19 where the primary power unit 18, 19 is further connected to the primary coil 2. The primary power unit is e.g. formed by the combination of primary control unit 18 and primary power electronics unit 19 as described with reference to the embodiment of FIG. 5. The primary sensor 20 can be one or more of a temperature sensor, a motion sensor, a sensor for the measurement of charging current or a sensor to measure any manipulation happening to the power transmission part 5 of the charging system. In an even further embodiment of the present invention, the contactless charger system comprises at least one secondary sensor 21 connected to a secondary power unit 16, 17, the secondary power unit 16, 17 being further connected to the secondary coil 6 and to the power storage unit 15. The secondary power unit is e.g. formed by the combination of secondary control unit 16 and secondary power electronics unit 17 as described with reference to the embodiment of FIG. 5. The secondary sensor 21 is e.g. implemented as a current sensor 21 as described above, but may also comprise multiple sensors monitoring the proper functioning of the power receiving part 9.

The present invention has been described above with reference to a number of exemplary embodiments as shown in the drawings. Modifications and alternative implementations of some parts or elements are possible, and are included in the scope of protection as defined in the appended claims.

The invention claimed is:

1. A contactless charger system for charging a power storage unit of an electrically driven vehicle, comprising
   a power transmission part having a primary coil around a primary magnetic circuit part, the primary magnetic circuit part having two primary pole faces, wherein the primary pole faces have a larger surface area compared to a cross section of the primary magnetic circuit part;
   a power receiving part having a secondary coil around a secondary magnetic circuit part, the secondary magnetic circuit part having two secondary pole faces, wherein a surface area of the secondary pole faces is smaller than the surface area of the primary pole faces,
   wherein, in operation, the two primary pole faces and the two secondary pole faces are aligned such that the primary and secondary magnetic circuit parts form a closed magnetic circuit, wherein the secondary magnetic circuit part is an integral part of an electrically driven vehicle stand,
   wherein the power transmission part comprises a flat contact surface, and the two primary pole faces are flat surfaces aligned with the flat contact surface.

2. The contactless charger system according to claim 1, wherein the electrically driven vehicle stand is a bicycle stand.

3. The contactless charger system according to claim 1, wherein the electrically driven vehicle is an electric bike.

4. The contactless charger system according to claim 1, wherein the power transmission part is stationary.

5. The contactless charger system according to claim 1, wherein the power transmission part comprises a housing.

6. The contactless charger system according to claim 1, wherein the power transmission part comprises a shielding cover.

7. The contactless charger system according to claim 1, wherein at least the primary coil and primary magnetic circuit part are embedded in a plastic material.

8. The contactless charger system according to claim 1, further comprising at least one primary sensor connected to a primary power unit, the primary power unit being further connected to the primary coil.

9. The contactless charger system according to claim 1, further comprising at least one secondary sensor connected to a secondary power unit, the secondary power unit being further connected to the secondary coil and to the power storage unit.

10. The contactless charger system according to claim 1, wherein the secondary pole faces rest on the flat contact surface.

* * * * *